(12) United States Patent
Mattis et al.

(10) Patent No.: US 6,880,091 B1
(45) Date of Patent: Apr. 12, 2005

(54) SYSTEM AND METHOD FOR AUTHENTICATION OF A USER OF A MULTI-FUNCTION PERIPHERAL

(75) Inventors: Steve Mattis, Boise, ID (US); John Hall, Nampa, ID (US); Bruce Holmstead, Middleton, ID (US); Kristin S. Dahl, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 894 days.

(21) Appl. No.: 09/607,568

(22) Filed: Jun. 29, 2000

(51) Int. Cl.$^7$ .................. G06F 11/30; G06F 12/14; H04L 9/00; H04L 9/32
(52) U.S. Cl. .................. 713/201; 713/202; 713/194
(58) Field of Search .................................. 713/170

(56) References Cited

U.S. PATENT DOCUMENTS

| | | | |
|---|---|---|---|
| 5,742,769 A | * 4/1998 | Lee et al. | 709/206 |
| 5,757,920 A | * 5/1998 | Misra et al. | 713/158 |
| 6,336,114 B1 | * 1/2002 | Garrison | 707/9 |

OTHER PUBLICATIONS

"Special Edition Using Netscape 2", Mark R. Brown, 1992, pp. 336, 338, 339, 342.*
http://www.opus1.com/www/presentations/emailproto/, DECUS Fall 1996, Slide 69, 70, and 72.*

Crispin, M., "Internet Message Access Protocol—Version 4", Request for Comments 1730, Network Working Group, Standards Track, Dec. 1994.

Crispin, M., "Internet Message Access Protocol—Version 4, Rev 1", Request for Comments 2060, Network Working Group, Standards Track, Dec. 1996.

Crispin, M. "Internet Message Access Protocol—Version 4, Rev 1", Request for Comments 3501, Network Working Group, Standards Track, Mar. 2003.

* cited by examiner

*Primary Examiner*—Gregory Morse
*Assistant Examiner*—Christopher J. Brown

(57) ABSTRACT

A system and method are provided in a multi-function peripheral to authenticate a user. The system includes a processor and a memory that are coupled to a local network. The system also includes send logic store on the memory and executable by the processor. The send logic includes logic to input a password associated with a user, and logic to authenticate the password and to obtain a FROM field identifier associated with the user. The system also features logic to lock the FROM field identifier into a FROM field associated with a data transmission.

27 Claims, 4 Drawing Sheets

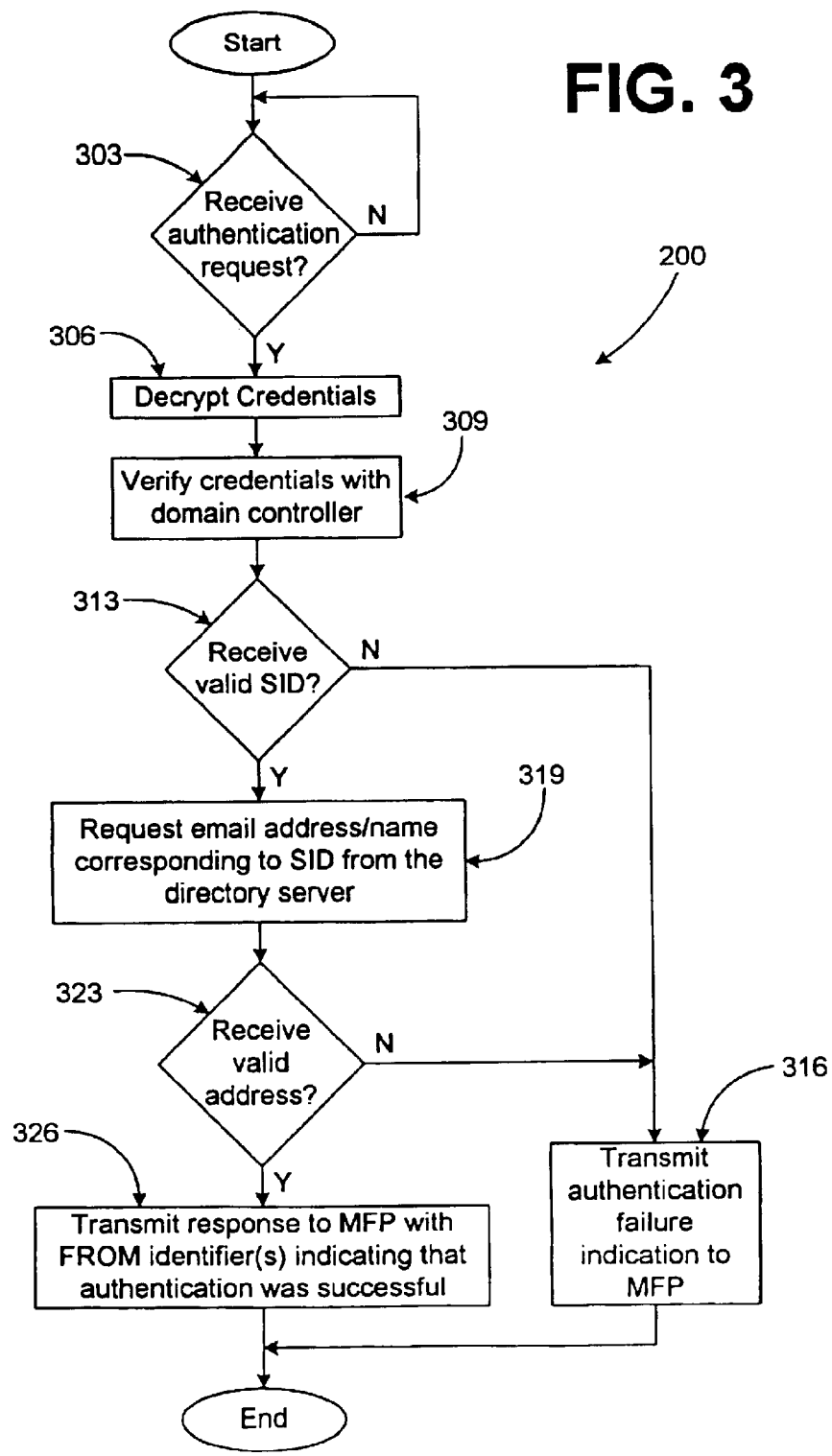

SYSTEM AND METHOD FOR AUTHENTICATION OF A USER OF A MULTI-FUNCTION PERIPHERAL

TECHNICAL FIELD

The present invention is generally related to the field of mufti-function peripherals and, more particularly, is related to a system and method for authentication of a user of a multi-function peripheral.

BACKGROUND OF THE INVENTION

Document handling technology has begun the task of integrating the functions of a printer, a scanner, and a copy machine into a single multi-function peripheral. In an office environment, such multi-function peripherals are often linked to a computer or a network to enable users to print documents from their computers on the same network. Also individuals may use the multi-function peripheral as the office copy machine and as a scanner.

In addition, multi-function peripherals may also include a digital sender to transmit documents as electronic mail or as a facsimile. In an office environment, the digital sending functionality of a multi-function peripheral provides a public point of access for transmission of documents. That is to say, that multiple parties can employ the multi-function peripheral to scan a document for transmission to a third party. This functionality differs from the electronic mail function, for example, of a typical computer in an office environment in that the computer is usually assigned to a particular individual, often times with limited access to the computer by requiring passwords, etc. Since a computer is dedicated to a single individual, a user who transmits a document via electronic mail, for example, usually does not have to specify from whom the document has been sent as the electronic mail functionality contained therein will automatically indicate the user as the sender of the document transmission. In this case, the computer knows from whom the document has been sent, that is, the user associated with the particular computer.

In the case of a multi-function peripheral, the user from whom a data transmission is sent is not automatically known. Consequently, multi-function peripherals provide users with the ability to enter their names or electronic mail address in conjunction with the transmission of a scanned document using the digital sending capability. Unfortunately, this can cause problems. In particular, a scheming user may illicitly send documents to another under an assumed name to tamper with the normal operation of a particular organization. Also, users may gain unauthorized access to such equipment to send information.

SUMMARY OF THE INVENTION

In light of the foregoing, a system and method are provided in a mule-function peripheral to authenticate a user. In this regard, the system includes a processor and a memory that are coupled to a local network. The system also includes send logic stored on the memory and executable by the processor. The send logic includes logic to input a password associated with a user, and logic to authenticate the password and to obtain a FROM field identifier associated with the user. The system also features logic to lock the FROM field identifier into a FROM field associated with a data transmission.

The present invention may also be viewed as a method for authenticating a user of a multi-function peripheral. Broadly stated, the method comprises the steps of inputting a password associated with a user into a device, authenticating the password and obtaining a FROM field identifier associated with the user, and, locking the FROM field identifier into a FROM field associated with a data transmission to be transmitted from the device.

According to another aspect of the present invention, a system and method are provided for authenticating a user. The system comprises a processor and a memory that are coupled to a local network. Also, authentication logic is stored on the memory and is executable by the processor. The authentication logic includes logic to verify a password associated with a user, and logic to obtain a FROM field identifier associated with the user.

The present invention may also be viewed as a method for authenticating a user. Broadly stated, the method comprises the steps of verifying a password associated with a user, and obtaining a FROM field identifier associated with the user.

Other features and advantages of the present invention will become apparent to a person with ordinary skill in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

FIG. 3 is a flow chart of authentication logic executed in a server in the office network of FIG. 1.

DETAILED DESCRIPTION OF THE INVENTION

Figure 1:
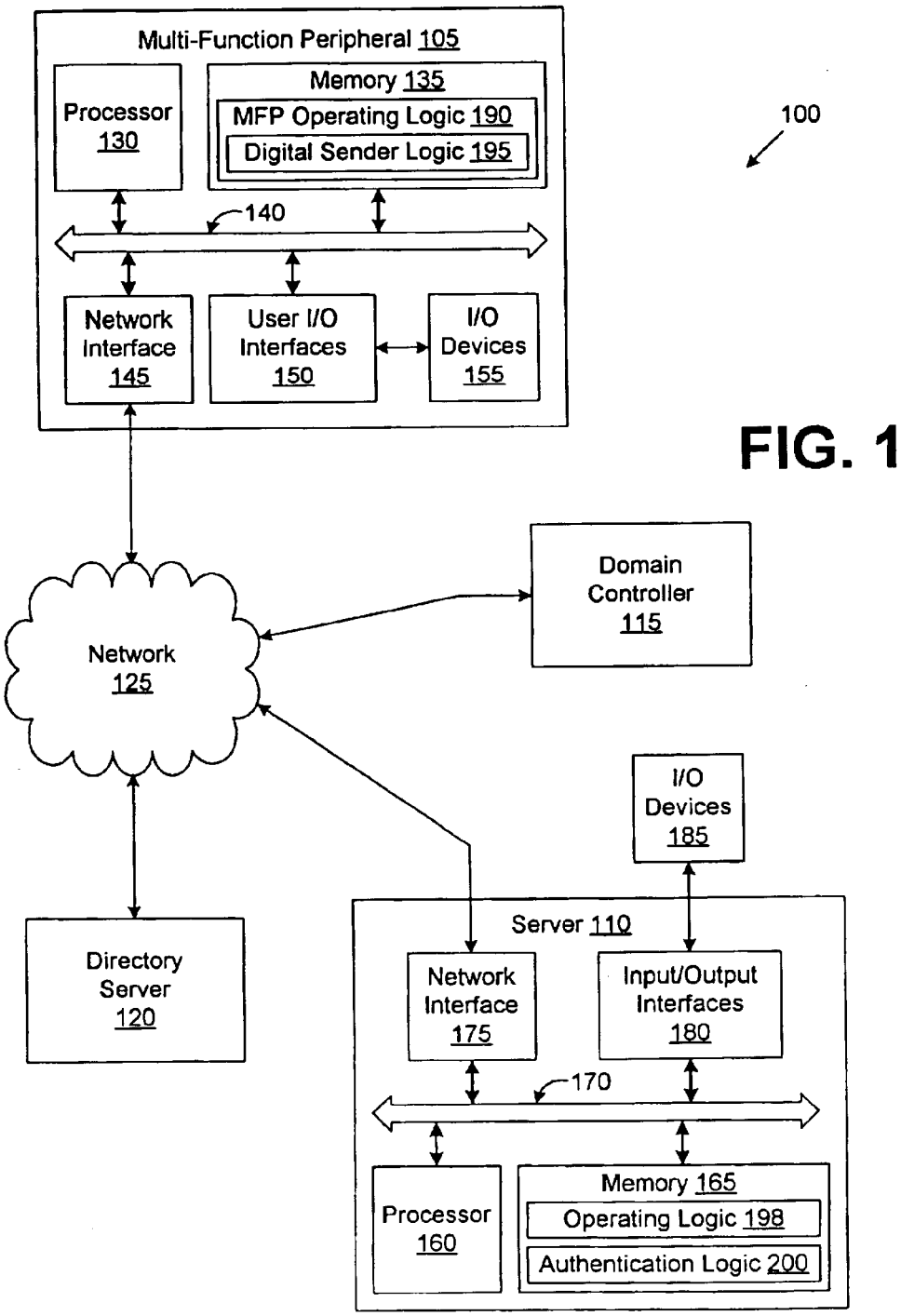
FIG. 1 is a block diagram of an office network according to the present invention.

With reference to FIG. 1, shown is an office network 100 according to the present invention. The office network 100 includes a multi-function peripheral (MFP) 105, a server 110, a domain controller 115, and a directory server 120. The MFP 105, server 110, domain controller 115, and the directory server 120 are all coupled to a network 125 and are in data communication with each other via the network 125. The network 125 may be, for example, a local area network, etc. The MFP 105 includes the functions of a copier, printer, and a scanner.

The MFP 105 includes a processor circuit to implement and control copy, print, and scan functions. The processor circuit includes a processor 130 and a memory 135, both of which are coupled to a local interface 140. The local interface 140 may be a data bus with an accompanying control bus as known by those with ordinary skill in the art.

The MFP 105 also includes a network interface 145 that couples the local interface 140 to the network 125. The network interface 145 may be, for example, an interface card or other interface that includes appropriate buffer or other circuitry that links the local interface 140 to the network 125 based upon the data communications protocol of the network 125. In addition to the network interface 145, the MFP 105 also includes input/output interfaces 150 that couple the local interface 140 with a number of input/output devices 155. The input/output devices 155 may include user input devices such as, for example, a keypad, touch pad, touch screen, microphone, mouse, joystick, or one or more push buttons, etc. User output devices may include display devices, speakers, printers, etc. The display devices may encompass, for example, a cathode ray tube (CRT), a liquid crystal display screen, a gas plasma-based flat panel display, indicator lights, light emitting diodes, and other display devices. Other user input/output devices 155 beyond those listed above may be employed as well. Note that there are also other input/output devices that are controlled by the processor 130 that perform the various functions of the MFP 105 including motors and other equipment, etc., as is known by those of ordinary skill in the on.

The server 110 also includes a processor circuit that includes a processor 160 and a memory 165, both of which are coupled to a local interface 170. Similar to the local interface 140, the local interface 170 may be a data bus with an accompanying control bus as known by those with ordinary skill in the art. The local interface 170 is coupled to the network 125 by a network interface 175. Also, the server 110 may include one or mare input/output devices 180 that are linked to the local interface 170 by one or more input/output interfaces 185. The input/output devices 180 may include, for example, devices similar to the input/output devices 155 discussed above.

In addition, the processors 130/160 and memories 135/165 may represent multiple processors and memories that operate in parallel. In such a case, the local interfaces 140/170 may each be an appropriate network that facilitates communication between any two of the multiple processors or between any one of the processors and any of the memories, etc. In addition, the processors 130/160, memories 135/165 and local interfaces 140/170 may be electrical or optical in nature. Also, the ;memories 135/165 may include both volatile and nonvolatile memory components. Volatile components are those that do not retain data values upon loss of power. Conversely, nonvolatile components retain data upon a loss of power. Thus, the memories 135/165 may comprise, for example, random access memory (RAM), read-only memory (ROM), hard disk drives, floppy disk drives, compact disk drives, tape drives, and/or other memory components, or a combination of any two or more of these memory components.

The MFP 105 also includes MR operating logic 190 that is stored on the memory 135 and executable by the processor 130. The WP operating logic 190 includes digital sender logic 195 that is executed to transmit a document from the MFP 105 to another device on the network 125 or to a device on an external network, for example, through a standard mail transfer protocol server (SMTP) (not shown) coupled to the network 125. The digital sender logic 195 includes logic that is executed to authenticate a particular user who wishes to transmit a document using MFP 105 as will be discussed.

The server 110 includes operating logic 198 and authentication logic 200. The operating logic 198 provides for the functionality of the server 110 in its general role on the network 125 as is known by those of ordinary skill in the art. The authentication logic 200 is executed by the processor 160 to authenticate a user in conjunction with an authentication request transmitted from the MFP 105.

Next a discussion of the general operation of the office network 100 is provided. To begin, a user approaches the MFP 105 with the desire to scan one or more hardcopy documents into digital form to be transmitted to one or more recipients. Assuming that the authentication functionality of the MFP 105 is active, the user places documents to be scanned on the machine and manipulates the appropriate input devices 155 to initiate the digital sending capability of the MFP 105. The MFP 105 then requires the user to input their username and their password using an appropriate input device 155. Note that the username is defined herein as the name by which a user is identified on the network 125 as opposed to the actual name of the user that is the name by which they are generally addressed.

The MFP 105 then determines if the username and password have been stored in the memory 135 are valid and may be reused. That is to say, every time a user is authenticated by the MFP 105, the WP 105 stores the username and password just in case the user has more than one scan/send job to perform consecutively. For each subsequent scan/send job performed by the user, the username and password are entered into the MFP 105. The MFP 105 will authenticate the user for these subsequent scan/send jobs by matching the stored username and password from the previous scan/send job with the currently entered credentials. Note, however, for this avenue of authentication to take place, the previous scan/send job has to be either pending or currently transmitting at the time the subsequent scan/send job is initiated. Note that a previous scan/send job is pending if the digital document that was scanned into the memory 135 is the last document in a send queue waiting to be transmitted behind other pending scan/send jobs.

Assuming, however, that the username and password cannot be authenticated based upon a prior scan/send job, the MR 105 then encrypts both the user password and the username, although the user password may be encrypted alone. The user password and the username are encrypted to prevent the password from being misappropriated on the network 125 by an unscrupulous individual who has access to the network 125. The WP 105 then transmits an authentication request to the server 110 along with the encrypted user password and username. If the MFP 105 is currently transmitting a digital document to various recipients from a prior scan/send job when the authentication request is to be transmitted to the server 110, then a parallel channel is employed to transmit the authentication request concurrently with the transmission of the digital document. This prevents a user from having to wait for a prior scan/send job to finish transmitting before they can initiate a subsequent scan/send job.

The server 110 responds to the authentication request by decrypting the user password and username. Next the server 110 communicates with the domain controller 115 to verify the user password and username accordingly. If the user password and the username are valid, the domain controller 115 informs the server 110 and also transmits a secure identification tag (SID) that is associated with the user to the server 110. If the user password and the username are not valid, then the domain controller 115 inform the server 110 as such and the server 110, in turn, informs the MFP 105 that the user could not be verified. The MFP 105 then prevents the user from scanning and transmitting the documents accordingly.

Assuming that the user password and the username were verified and the secure identification tag is received from the domain controller 115, the server 110 then supplies the secure identification tag to the directory server 120 along with at request for an email address and/or a name that is associated with the user. The directory server 120 identifies this information based upon the secure identification tag.

The directory server 120 then transmits the email address and/or the name of the user to the server 110. The server 110 then sends a response to the MFP 105 that includes the email address and/or the name of the user. Note if an email address and/or name could not be identified by the directory server 120 based upon the secure identification tag, the server 110 will transmit a response to the WP 105 that indicates the user could not be verified and further scanning and transmission of the document is disallowed.

Assuming that the server 110 has responded to the MFP 105 verifying the user with a corresponding email address and/or name, the WP 105 associates either the email address, the name of the user, or both with the pending transmission of document. In particular, each transmission from the MFP 105 includes a "FROM" field in which the email address, name of the user, or other identifying information may be placed. In this regard, the email address, name of the user, or other identifying information is referred to as a "FROM" identifier that identifies the sender to the recipient. The association of a particular FROM identifier with a transmission involves placing the FROM identifier into the FROM field. For example, in the case that the scanned document is sent by email, the FROM identifier may be the email address that is included in the FROM field of the email. In the case that the scanned document is sent by facsimile, the FROM identifier may be the name of the user that is included in a FROM field that ultimately, is included in a cover page of the facsimile. Note that if a user was authenticated based upon a prior scan/send job as discussed above, the prior email address and/or the name of the user stored in the memory 135 is placed into the FROM field, thereby bypassing the necessity of communicating with the server 110 to authenticate the username and password.

In addition, the MFP 105 "locks" the FROM identifier into the FROM field so that the user is prevented from entering or otherwise altering the FROM identifier. This is to prevent an unscrupulous individual from entering a FROM identifier that is not their own to send an illicit transmission from the MFP 105 without personal accountability and with negative consequences to the individual who was associated with the transmission. The locking function ensures that only the FROM identifier associated with the user password entered previously appears in the FROM field by preventing a user from altering or entering a new FROM identifier.

Once the FROM identifier is locked into the FROM field, the user then inputs the address(es) and/or telephone number(s) of the recipient(s). The MFP 105 commences the scan function and then places the document in the send queue for transmission to the respective recipients. The FROM identifier may also be employed to inform the user if a particular transmission was not successfully transmitted. For example, if the scanned document was to be sent by email, the FROM identifier (email address) can be used as the return address for the email that did not make it to its destination. In the case that the scanned document is to be sent by facsimile, the email address that was obtained with the name of the user can be used to send a digital confirmation as to whether the facsimile was successfully transmitted.

Figure 2A:
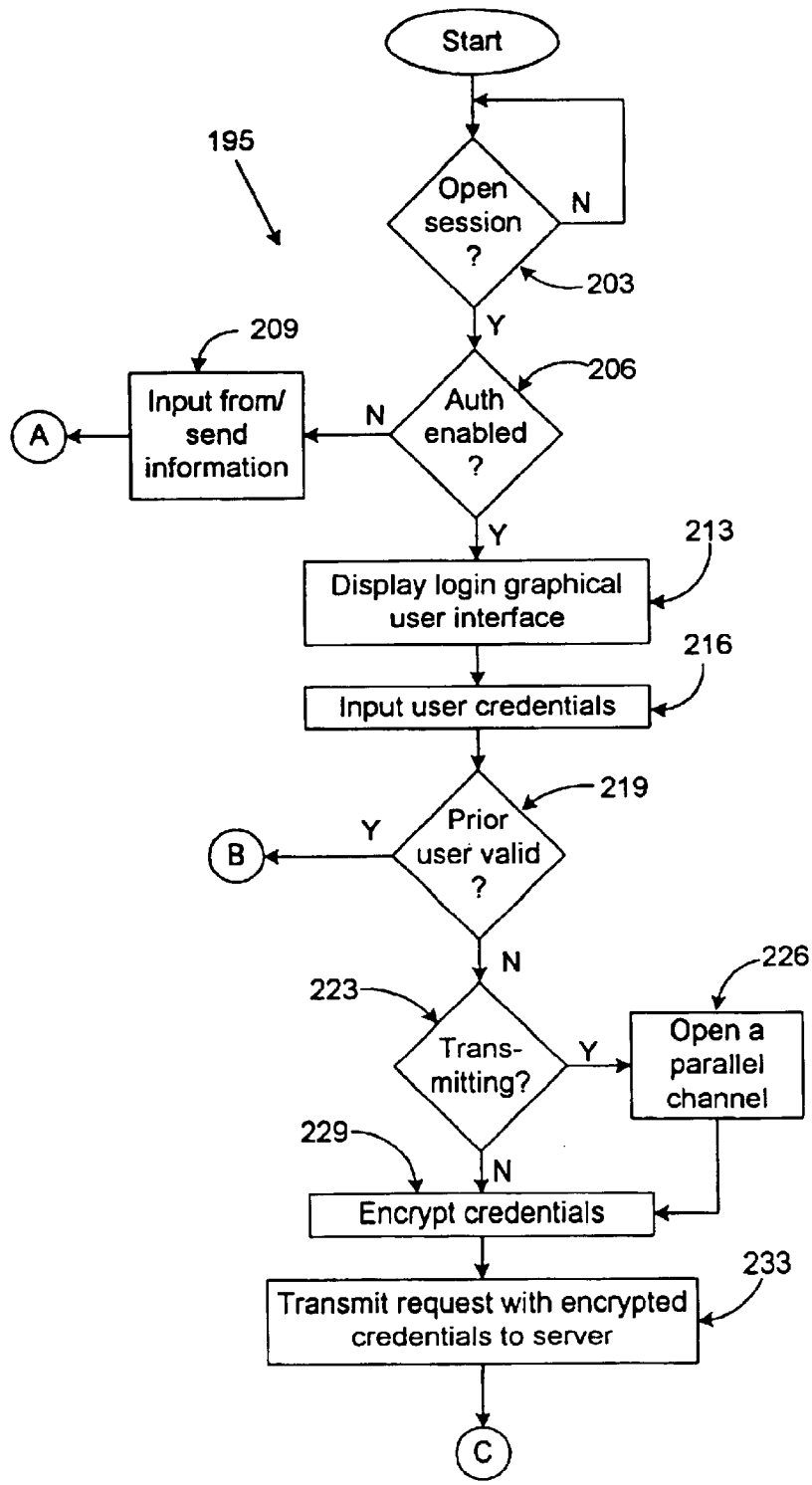
FIG. 2A is a flow chart of digital sender logic executed in a multi-function peripheral in the office network of FIG. 1.

With the foregoing in mind, reference is made to FIG. 2A in which a flow chart is depicted of the digital sender logic 195 according to an embodiment of the present invention. The digital sender logic 195 is executed to perform the scanning and digital sending functions as well as the authentication functions in the WP 105 as discussed above. Beginning with block 203, the digital sender logic 195 ascertains whether a send operation is to be performed. A send operation begins upon an occurrence of an appropriate send input such as, for example, pressing a send button either in the form of a push button or a button on a touch screen as one of the I/O devices 155 (FIG. 1). If in block 203 an appropriate input has been received indicating that a send operation is to be performed, then the digital sender logic 195 progresses to block 206. In block 206 it is determined whether the authentication feature of the MFP 105 has been enabled. If the authentication feature has not been enabled, then the digital sender logic 195 moves to block 209 in which the sender and the recipient of a particular scan/send job is entered in by the user. The digital sender logic 195 then moves to connector A that ultimately bypasses the authentication process on the MFP 105.

On the other hand, if in block 206 the authentication feature of the MR 105 is enabled, then the digital sender logic 195 progresses to block 213. Thus, as shown in block 206, the digital sender logic 195 provides the ability to disable the authentication features of the MFP 105 altogether. To do this, for example, a bit within the memory 135 (FIG. 1) may be set in an active or inactive state that corresponds to whether the authentication function is active or inactive. In block 206, this bit may be examined to determine its state and the digital sender logic 195 responds accordingly.

In block 213, the digital sender logic 195 causes a display to appear in an appropriate output device 155 that provides an interface for a user to log into the MFP 105 to perform the scan/send job. Next, in block 216 the digital sender logic 195 receives the username and user password as inputs that are entered by the user by manipulating the interface. Thereafter, in block 219 it is determined whether the username and user password correspond with a previous username and password of a prior scan/send job that is currently pending or transmitting. If such is the case, then the digital sender logic 195 moves to connector B in which the FROM identifier(s) stored from the prior scan/send job are locked into the FROM field for the current scan/send job. If the prior scan/send job is neither pending nor transmitting, then the digital sender logic 195 moves to block 223.

In block 223, the digital sender logic 195 determines if the MFP 105 is currently transmitting a digital document to respective recipients. This may be the case if there were one or more digital documents in the send queue in the MFP 105 that are waiting to be transmitted. If there is currently a digital document transmitting, then the digital sender logic 195 moves to block 225 in which a parallel channel is opened in which to transmit an authentication request to the server 110 This is done so that the current user does not have to wait for a prior scan/send job to finish transmitting before they can be authenticated for a subsequent scan/send job. If there is not digital document currently transmitting in block 223 or after a parallel channel has been opened in block 226, the digital sender logic 195 moves to block 229.

Then, in block 229, the user password is encrypted for transmission across the network 125 (FIG. 1) to server 110 (FIG. 1). This is done to insure that unscrupulous users who have access to the network 125 are not able to intercept a user password of a particular user of the MFP 105. In addition, the username may also be encrypted as well. After the username and user password are encrypted in block 229, the digital sender logic 195 progresses to block 233 in which a request for validation of the user password and username is transmitted to the server 110 accompanied by the encrypted password and the username. The digital sender logic 195 then progresses to connector C.

Figure 2B:
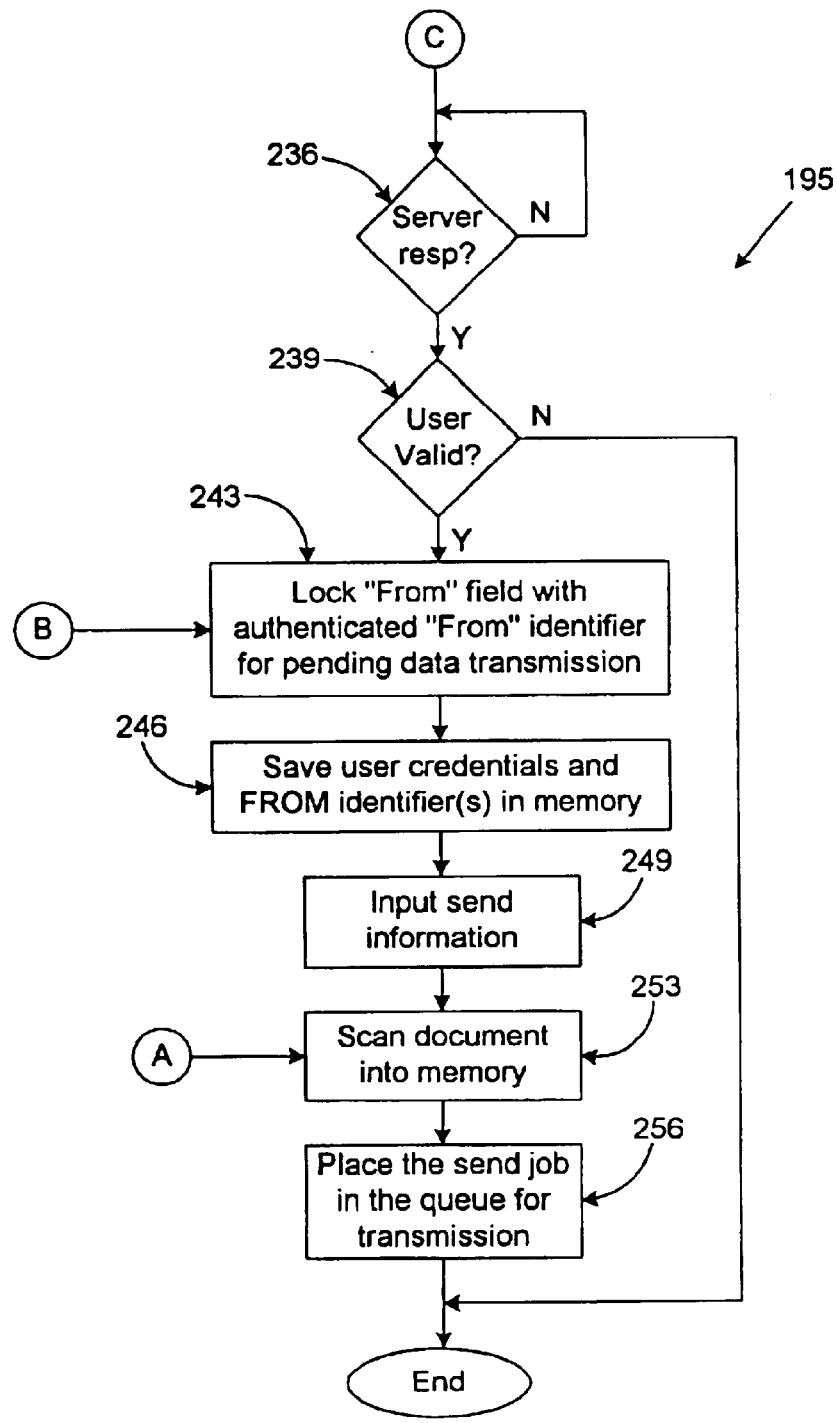
FIG. 2B is a flow chart of send authentication logic executed in conjunction with the digital sender logic of FIG. 2A.

With reference to FIG. 2B, shown is a continuation of the digital sender logic 195. From connector C, the digital sender logic 195 moves on to block 236 in which the digital sender logic 195 waits to receive a response from a server 110 (FIG. 1). Assuming a response has been received, then the digital sender logic 195 moves to block 239 to determine whether the response indicates that the user credentials transmitted have been authenticated or are valid. If it is determined that they are not valid, then the digital sender logic 195 ends accordingly. However, if it is determined that the credentials are valid, then the digital sender logic 195 moves to block 243 in which an email address or username are locked into a "FROM" field that is associated with the pending date of transmission. Note that a "valid" response received from the server 110 is accompanied by the email address and/or the name of the user, i.e. the FROM identifiers, as discussed previously, such information having been obtained from the directory server 120 (FIG. 1). In addition, connector B also leads to block 243 from block 219 (FIG. 2A) as discussed above.

Once the FROM identifier(s) is/are locked into the FROM field in block 243, the digital sender logic 195 progresses to block 246 in which the username, user password, and the associated FROM identifier(s) are stored in the memory 135 for potential future use as determined in block 219 (FIG. 2A). Thereafter, the digital sender logic 195 moves to block 249 in which the recipient address, telephone number, etc. is entered into a "TO" field. The TO field is associated with the current scan/send job and indicates the proper recipients) of the document. Thereafter, the digital sender logic 195 proceeds to block 253 in which the document is scanned by the MFP 105 into the memory 135. Next, in block 256 the current scan/send job is placed in the send queue for transmission to the appropriate recipients. If no prior scan/send job is currently transmitting, then the current scan/send job is immediately transmitted to the recipients.

Referring next to FIG. 3, shown is a flow chart of the authentication logic 200 that is executed by the server 110 (FIG. 1) to validate a particular user as requested by MFP 105 (FIG. 1) according to an embodiment of the present invention. The authentication logic 200 is executed by the processor 160 (FIG. 1) in communicating with the domain controller 115 (FIG. 1), the directory server 120 (FIG. 1) and the WP 105 to perform the validation task. Beginning with block 303, the authentication logic 200 determines whether an authentication request has been received from the MFP 105 along with an associated user password and username. If such is the case, then the authentication logic 200 progresses to block 306 in which the user password is decrypted and the username is also decrypted if necessary. Then, in block 309 the user password and username are verified with the domain controller 115. The domain controller 115 verifies that the user password and the username are valid on the network 125 (FIG. 1) and also identifies a secure identification tag that is associated with the user based upon the username and/or the user password. The secure identification tag is a globally unique identifier that is associated with the user.

If the user password and the username are valid as determined by the domain controller 115, then the domain controller 115 will transmit the secure identification tag to the server 110 along with an indication that the username and user password are valid. In block 313, the authentication logic 200 determines whether the domain controller 115 has provided a valid secure identification tag. If not, then the authentication logic 200 progresses to block 316. On the other hand if a response is received from the domain controller 115 with a valid secure identification tag with the indication that the user is a valid user, then the authentication logic progresses to block 319.

In block 319 an appropriate email address and/or name that corresponds to the secure identification tag is requested from the directory server 120 using the lightweight directory access protocol (LDAP) that operates on the directory server 120 (FIG. 1). The lightweight directory access protocol is generally known by those with ordinary skill in the art and is not discussed herein in detail. Thereafter, in block 323 the authentication logic 200 determines whether a valid response with an email address or name has been received from the directory server 120. If such is the case then the authentication logic 200 progresses to block 326. If not, then the authentication logic 200 moves to block 316.

In block 326 a response is transmitted to the MFP with the appropriate email address and/or name of the user. This indicates to the MFP 105 that the authentication of the user was successful and that further scanning and transmission tasks can be completed. Also, the email address and/or the name of the user supplied to the MFP 105 can be used in the "FROM" field associated with the particular transmission of the scanned document. On the other hand, in block 316 the authentication logic 200 transmits an authentication failure indication to the MFP 105 indicating that the user has not been authenticated. This prevents the user from scanning and/or transmitting the document as the user is not validated on the network 125. After block 326 and/or 316, the authentication logic 200 ends accordingly.

Although the logic 195 (FIGS. 2A–B) and 200 (FIG. 3) of the present invention is embodied in software as discussed above, as an alternative the logic 195 and 200 may also be embodied in hardware or a combination of software and hardware. If embodied in hardware, the logic 195 and 200 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram of FIG. 1 and flow charts of FIGS. 2A, 2B, and 3 show the architecture, functionality, and operation of an implementation of the logic 195 and 200. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the block diagram of FIG. 1 and the flow charts of FIGS. 2A, 2B, and 3 show a specific order of execution, it is understood that the order of execution may differ from that which is depicted. For example, the order of execution of two or more blocks may be scrambled relative to the order shown. Also, two or more blocks shown in succession in FIGS. 2A, 2B, and 3 may be executed concurrently or with partial concurrence. It is understood that all such variations are within the scope of the present invention.

Also, the logic 195 and 200 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the logic 195 and 200 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc read-only memory (CDROM).

Many variations and modifications may be made to the above-described embodiment(s) of the invention without departing substantially from the spirit and principles of the invention. All such modifications and variations are intended to be included herein within the scope of the present invention.

What is claimed is:

1. A system for authenticating a user, comprising:
    a processor coupled to a local interface;
    a memory coupled to the local interface ; and
    send logic stored on the memory and executable by the processor, the send logic comprising:
        logic to input a password associated with a user;
        logic to authenticate the password and to obtain a FROM field identifier associated with the user; and
        logic to lock the FROM field identifier into a FROM field associated with a data transmission.

2. The system of claim 1, wherein the send logic further comprises logic to input a username.

3. The system of claim 1, wherein the FROM field identifier further comprises a name of the user.

4. The system of claim 1, wherein the FROM field identifier further comprises an electronic mail address associated with the user.

5. A system for authenticating a user, comprising:
    means for inputting a password associated with a user;
    means for authenticating the password and for obtaining a FROM field identifier associated with the user; and
    means for locking the FROM field identifier into a FROM field associated with a data transmission.

6. The system of claim 5, further comprising means for inputting a username.

7. The system of claim 5, wherein the FROM field identifier further comprises a name of the user.

8. The system of claim 5, wherein the FROM field identifier further comprises an electronic mail address associated with the user.

9. A method for authenticating a user, comprising the steps of:
    inputting a password associated with a user into a device;
    authenticating the password and obtaining a FROM field identifier associated with the user; and
    locking the FROM field identifier into a FROM field associated with a data transmission to be transmitted from the device.

10. The method of claim 9, further comprising the step of inputting a username.

11. A system for authenticating a user, comprising:
    a processor coupled to a local interface;
    a memory coupled to the local interface; and
    authentication logic stored on the memory and executable by the processor, the authentication logic comprising:
        logic to verify a password associated with a user comprising logic to communicate with a domain controller to verify the password and to obtain a secure identification tag associated with the user from the domain controller;
        logic to obtain a FROM field identifier associated with the user comprising logic to request the FROM field identifier from an electronic mail server based upon the secure identification tag, the FROM field identifier being associate with the secure identification tag;
        logic to send the FROM field identifier to a digital sending device to be locked in a FROM field associated with a data transmission in a manner that prevents a user from entering or altering the FROM field identifier at the digital sending device.

12. The system of claim 11, wherein the authentication logic further comprises logic to apply the FROM field identifier to send logic to be associated with a data transmission.

13. The system of claim 11, wherein the logic to verify a password associated with a user further comprises logic to decrypt the password.

14. A system for authenticating a user, comprising:
    means for verifying a password associated with a user comprising means for communicating with a domain controller to verify the password and to obtain a secure identification tag associated with the user from the domain controller;
    means for obtaining a FROM field identifier associated with the user comprising means for requesting the FROM field identifier from an electronic mail server based upon the secure identification tag, the FROM field identifier being associated with the secure identification tag; and
    means for sending the FROM field identifier to a digital sending device to be locked in a FROM field associated with a data transmission in a manner that prevents a user from entering or altering the FROM field identifier at the digital sending device.

15. The system of claim 14, further comprising means for applying the FROM field identifier to send logic to be associated with a data transmission.

16. The system of claim 14, wherein the means for verifying a password associated with a user further comprises logic to decrypt the password.

17. A method for authenticating a user, comprising the steps of:
    verifying a password associated with a user by communicating with a domain controller to verify the password and to obtain a secure identification tag associated with the user from the domain controller;
    obtaining a FROM field identifier associated with the user by requesting the FROM field identifier from a directory server based upon the secure identification tag, the FROM field identifier being associated with the secure identification tag; and
    sending the FROM field identifier to a digital sending device to be locked in a FROM field associated with a data transmission in a manner that prevents a user from entering or altering the FROM field identifier at the digital sending device.

18. The method of claim 17, further comprising the step of applying the FROM field identifier to send logic to be associated with a data transmission.

19. The method of claim 17, wherein the step of verifying a password associated with a user further comprises the step of decrypting the password.

20. An authentication method, comprising the steps of:

inputting a username and a password associated with a user into a device, the username identifying the user on a network;

sending an authentication request with the username and the password to authentication logic on a server on the network;

employing the authentication logic to verify that the username and password are valid with a domain controller;

employing the authentication logic to request a FROM field identifier corresponding to a secure identification tag associated with the user from a directory server if the username and password are valid, the secure identification tag being obtained from the domain controller;

sending the FROM field identifier from the authentication logic to the device in response to the authentication request if the FROM field identifier is successfully identified based on the secure identification tag; and locking the FROM field identifier into a FROM field associated with a first data transmission to be sent from the device to a destination device if the FROM field identifier is received in the device; and preventing a user from entering or altering the FROM field identifier at the device.

21. The authentication method of claim 20, further comprising the step of sending an authentication failure from the authentication logic to the device if the username and the password are determined to be invalid.

22. The authentication method of claim 21, further comprising the step of preventing the sending of the first data transmission from the device upon receipt of the authentication failure in the device.

23. The authentication method of claim 20, further comprising the step of sending an authentication failure from the authentication logic to the device if the FROM field identifier is not successfully identified based on the secure identification tag.

24. The authentication method of claim 20, further comprising the step of employing the FROM field identifier to send a confirmation to a user device indicating whether the first data transmission was successfully sent to the destination device.

25. The authentication method of claim 20, further comprising the step of storing the username and the password in a memory to the device while the sending of the first date transmission is pending or is currently in progress.

26. The authentication method of claim 25, further comprising the steps of:

inputting a second username and a second password into the device while the sending of the first data transmission is pending or is currently in progress;

determining if the second username and the second password corresponds with the username and the password; and locking the FROM field identifier into the FROM field associated with a subsequent data transmission to be transmitted from the device to a subsequent destination device if the second username and second password correspond with the username and the password.

27. The authentication method of claim 20, further comprising the step of opening a parallel channel to send the authentication request to the authentication logic on the server on the network if a prior data transmission is currently being sent to a previous destination device.

* * * * *

UNITED STATES PATENT AND TRADEMARK OFFICE
CERTIFICATE OF CORRECTION

PATENT NO. : 6,880,091 B1
APPLICATION NO. : 09/607568
DATED : April 12, 2005
INVENTOR(S) : Mattis et al.

It is certified that error appears in the above-identified patent and that said Letters Patent is hereby corrected as shown below:

Column 1, Line 8, delete "mufti-function" and insert therefor --multi-function--
Column 1, Line 56, delete "mule-function" and insert therefor --multi-function--
Column 2, Line 1, after "the steps of" insert --:--
Column 2, Line 67, after "network" delete ":"
Column 3, Line 16, after "skill in the" delete "on" and insert therefor --art--
Column 3, Line 24, delete "mare" and insert therefor --more--
Column 3, Line 38, delete ";memories" and insert therefor --memories--
Column 3, Line 47, delete "MR" and insert therefor --MFP--
Column 3, Line 50, delete "WP" and insert therefor --MFP--
Column 4, Line 15, delete "WP" and insert therefor --MFP--
Column 4, Line 32, delete "MR" and insert therefor --MFP--
Column 4, Line 37, delete "WP" and insert therefor --MFP--
Column 4, Line 56, delete "inform" and insert therefor --informs--
Column 4, Line 65, delete "at" and insert therefor --a--
Column 5, Line 7, delete "WP" and insert therefor --MFP--
Column 5, Line 12, delete "WP" and insert therefor --MFP--
Column 5, Line 27, after "ultimately" delete ","
Column 5, Line 64, delete "WP" and insert therefor --MFP--
Column 6, Line 14, delete "MR" and insert therefor --MFP--
Column 6, Line 48, after "server 110" insert --.--
Column 6, Line 59, after "as well." begin a new paragraph
Column 7, Line 41, delete "WP" and insert therefor --MFP--
Column 9, Claim 1, Line 20, after "A system" insert --in a digital sending device--
Column 9, Claim 1, Line 25, after "with" delete "a" and insert therefor --the--
Column 9, Claim 1, Line 27, after "user" insert --, wherein the FROM field identifier is obtained from a directory server through authentication logic executed on a server on a network, the digital sending device being coupled to the network--
Column 9, Claim 1, Line 29, after "transmission" insert --, wherein the user is prevented from entering or altering the FROM field identifier at the digital sending device--
Column 9, Claim 5, Line 37, after "A system" insert --in a digital sending device--
Column 9, Claim 5, Line 38, after "associated with" delete "a" and insert therefor --the--
Column 9, Claim 5, Line 40, after "user" insert --, wherein the FROM field identifier is obtained from a directory server through authentication logic executed on a server on a network, the digital sending device being coupled to the network--
Column 9, Claim 5, Line 42, after "transmission" insert --, thereby preventing the user from entering or altering the FROM field identifier at the digital sending device--
Column 9, Claim 9, Line 53, after "device" insert --coupled to a network--

UNITED STATES PATENT AND TRADEMARK OFFICE
CERTIFICATE OF CORRECTION

PATENT NO. : 6,880,091 B1
APPLICATION NO. : 09/607568
DATED : April 12, 2005
INVENTOR(S) : Mattis et al.

It is certified that error appears in the above-identified patent and that said Letters Patent is hereby corrected as shown below:

Column 9, Claim 9, Line 55, after "user" insert --from a directory server coupled to the network--
Column 9, Claim 9, Line 58, after "device" insert --and preventing a user from entering or altering the FROM field identifier at the device--
Column 10, Claim 11, Line 8, delete "associate" and insert therefor --associated--
Column 11, Claim 20, Line 21, after "tag;" delete "and"
Column 12, Claim 25, Line 14, after "memory" delete "to" and insert therefor --in--
Column 12, Claim 25, Line 14, delete "date" and insert therefor --data--

Signed and Sealed this

Fifteenth Day of September, 2009

David J. Kappos
*Director of the United States Patent and Trademark Office*